(12) United States Patent
Khosla

(10) Patent No.: US 8,712,775 B1
(45) Date of Patent: *Apr. 29, 2014

(54) METHOD AND SYSTEM TO GENERATE FINITE STATE GRAMMARS USING SAMPLE PHRASES

(71) Applicant: West Corporation, Omaha, NE (US)

(72) Inventor: Ashok Mitter Khosla, Palo Alto, CA (US)

(73) Assignee: West Interactive Corporation II, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,016

(22) Filed: Jan. 31, 2013

Related U.S. Application Data

(63) Continuation of application No. 10/928,684, filed on Aug. 26, 2004, now Pat. No. 8,396,712.

(51) Int. Cl.
   *G10L 15/00* (2013.01)

(52) U.S. Cl.
   USPC .......................................... 704/257; 704/236

(58) Field of Classification Search
   USPC .............................. 704/9, 236, 251, 257, 270
   See application file for complete search history.

(56) References Cited

U.S. PATENT DOCUMENTS

| | | | |
|---|---|---|---|
| 5,596,634 A | 1/1997 | Fernandez et al. | |
| 6,009,392 A * | 12/1999 | Kanevsky et al. | 704/245 |
| 6,243,679 B1 * | 6/2001 | Mohri et al. | 704/256.8 |
| 6,269,336 B1 | 7/2001 | Ladd et al. | |
| 6,292,783 B1 | 9/2001 | Rohler et al. | |
| 6,324,513 B1 | 11/2001 | Nagai et al. | |
| 6,434,523 B1 * | 8/2002 | Monaco | 704/257 |
| 6,567,805 B1 | 5/2003 | Johnson et al. | |
| 6,684,183 B1 * | 1/2004 | Korall et al. | 704/9 |
| 6,778,949 B2 * | 8/2004 | Duan et al. | 704/2 |
| 6,895,084 B1 | 5/2005 | Saylor et al. | |
| 7,080,004 B2 * | 7/2006 | Wang et al. | 704/9 |
| 7,257,529 B2 * | 8/2007 | Bennett | 704/9 |
| 8,396,712 B2 * | 3/2013 | Khosla | 704/257 |
| 2001/0049688 A1 | 12/2001 | Fratkina et al. | |
| 2002/0154153 A1 | 10/2002 | Messinger et al. | |
| 2002/0156616 A1 * | 10/2002 | Russell | 704/4 |
| 2002/0188599 A1 | 12/2002 | McGreevy | |
| 2003/0182124 A1 | 9/2003 | Khan | |
| 2004/0083092 A1 | 4/2004 | Valles | |
| 2004/0243387 A1 * | 12/2004 | De Brabander | 704/1 |

* cited by examiner

*Primary Examiner* — Angela A Armstrong

(57) ABSTRACT

A method and system for generating a finite state grammar is provided. The method comprises receiving user input of at least two sample phrases; analyzing the sample phrases to determine common words that occur in each of the sample phrases and optional words that occur in only some of the sample phrases; creating a mathematical expression representing the sample phrases, the expression including each word found in the sample phrases and an indication of whether a word is a common word or an optional word; displaying the mathematical expression to a user; allowing the user to alter the mathematical expression; generating a finite state grammar corresponding to the altered mathematical expression; and displaying the finite state grammar to the user.

18 Claims, 4 Drawing Sheets

METHOD AND SYSTEM TO GENERATE FINITE STATE GRAMMARS USING SAMPLE PHRASES

CROSS-REFERENCE TO RELATED APPLICATIONS

This application is a continuation from U.S. patent application Ser. No. 10/928,684, filed Aug. 26, 2004, and entitled "METHOD AND SYSTEM TO GENERATE FINITE STATE GRAMMARS USING SAMPLE PHRASES", which is incorporated by reference herein in its entirety.

FIELD OF THE INVENTION

Embodiments of the invention relate to speech recognition, and in particular to the creation of finite state grammars.

BACKGROUND

A finite state grammar is used in speaker independent speech recognition applications to map a variety of spoken options (phrases) to a return value. For example, the return value "H P480" corresponding to a model number e.g. for a computer, may be mapped to the following spoken options.
 "H P four eighty";
 "four eighty";
 "four eight zero";
 "H P four eight zero";
 "H P forty eight zero";
 "H P four hundred and eighty"; and
 "H P four hundred eighty".

Each of the above spoken options together define a finite state grammar, which can be represented using the following mathematical expression:
 [? (H P) [(forty eight zero) (four [(? (hundred ? and) eighty) (eighty zero)])])],
where [ ] is "or", ( ) is "and", and ? denotes a zero or one occurrence.

If a spoken option matches a phrase in the finite state grammar, then a speech recognition application (system) using the finite state grammar will recognize the spoken option as the return value associated with the sample phrase. If, however the spoken option does not match a phrase in the finite state grammar, then the speech recognition application/system will not recognize the spoken option.

Thus, it will be appreciated that a finite state grammar used by a speech application should be comprehensive enough to be able to allow the system to map all possible spoken options for a phrase to a return value.

Finite state grammars used by speech recognition applications are generally represented by mathematical expression similar to the one described above. Unfortunately, generating such a mathematical expression for a finite state grammar is beyond the skill of developers who build speech recognition applications.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention provide a method and system to generate a finite state grammar based on sample phrases entered/input by a developer. Advantageously, the developer enters only a few sample phrases, e.g. four or five, and the system generates a mathematical expression for a finite state grammar defined by the sample phrases. The developer has the option to modify or alter the mathematical expression, whereupon the system generates all strings/phrases for a modified finite grammar based on the modified mathematical expression. Advantageously, the string/phrases for the modified finite state grammar are displayed to the developer, who can then examine the strings/phrases in the modified grammar to determine whether the phrases/expressions likely to be spoken-input to the system, and should thus form part of the modified grammar, are missing. The expression can then be further modified in order to generate a finite state grammar with the missing strings/expressions.

One advantage of the techniques disclosed herein is that immediate feedback is provided so that a developer may immediately see what effect modifying or altering the expression has on the finite state grammar. Further, the techniques disclosed herein provide a good indication of the comprehensiveness or depth of the grammar to the developer by displaying each string/phrase of the finite state grammar. Other advantages of the invention will become apparent from the detailed description below.

Figure 1:
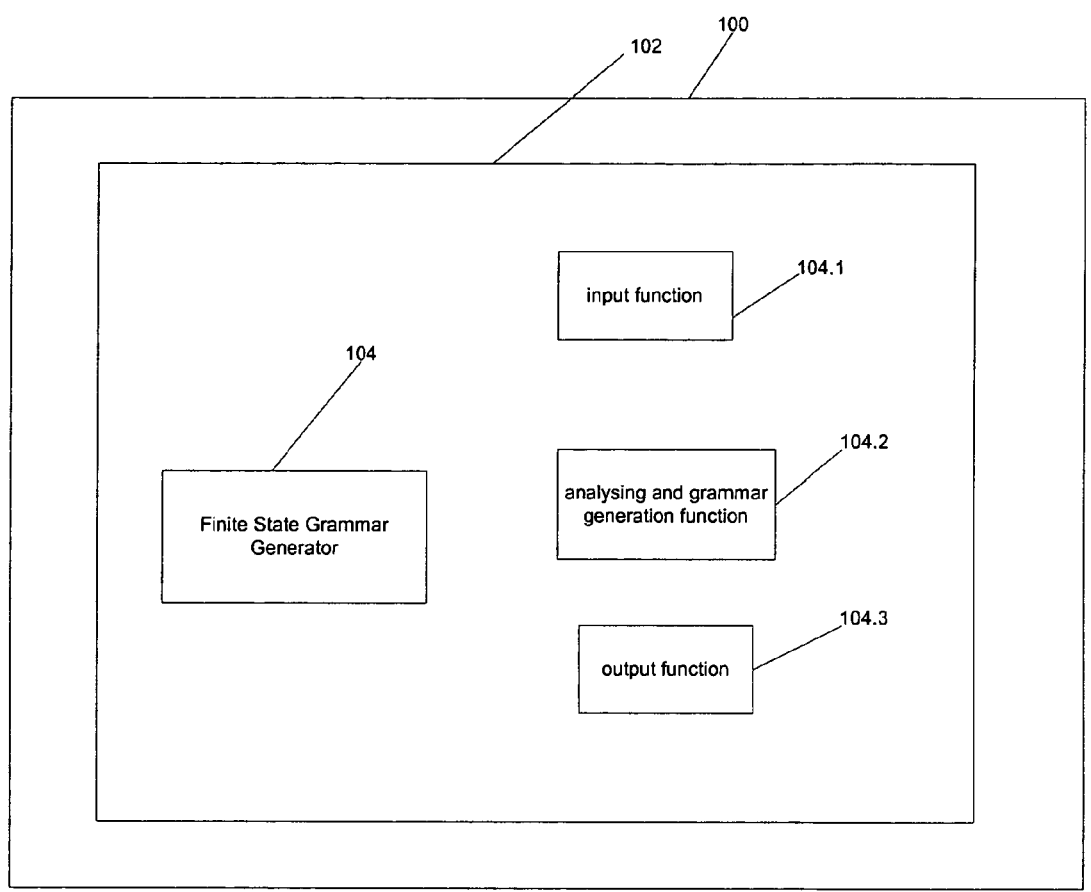
FIG. 1 shows the high level functional block diagram of a speech recognition system in accordance with one embodiment of the inventions.
Figure 4:
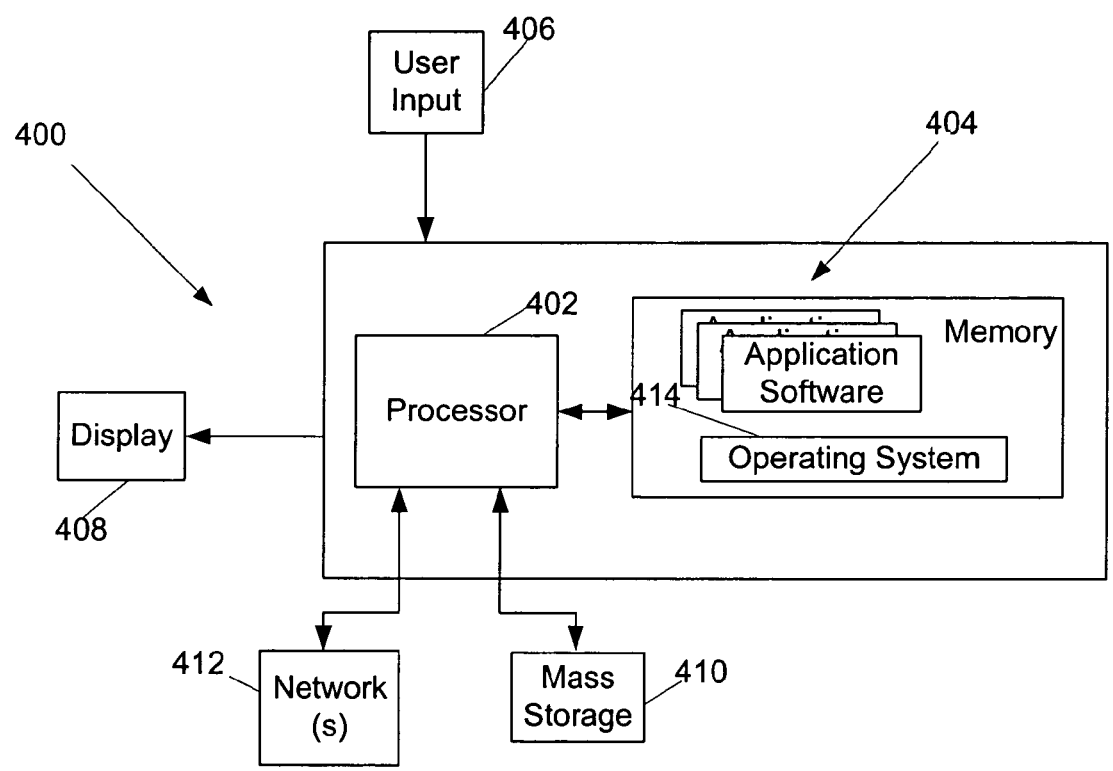
FIG. 4 shows a high-level block diagram of hardware that may be used to implement the system of FIG. 1.

Referring to FIG. 1 of the drawings, there is shown a high-level functional block diagram of a speech recognition/voice response system 100, in accordance with one embodiment of the invention. The speech recognition system 100 includes software 102 which includes a finite state grammar generator 104 to implement the various techniques described herein. For convenience, the finite state grammar 104 may be thought of as having an input function 104.1, an analyzing and finite grammar generation function 104.2, and an output function 104.3. Representative hardware for implementing the system 100 is illustrated in FIG. 4 of the drawings, which is described below.

Figure 2:
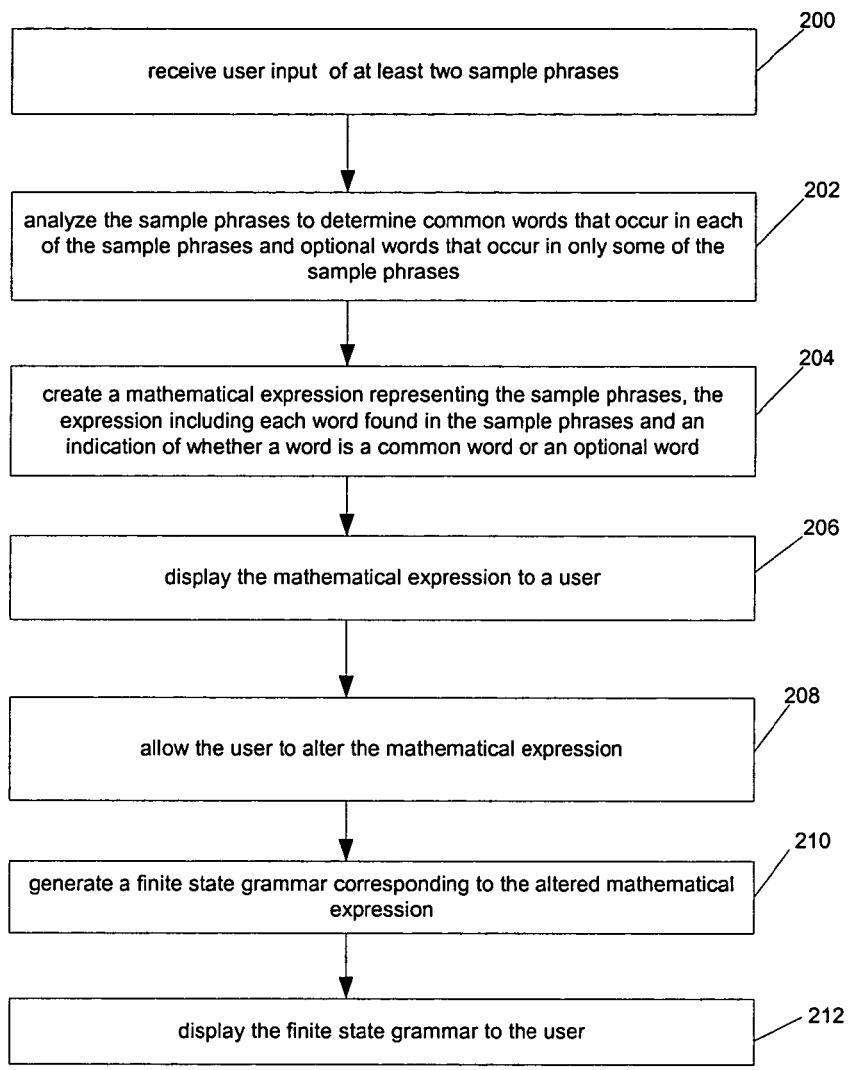
FIG. 2 shows a flow chart of operations performed by the speech recognition system of FIG. 1, in accordance with one embodiment of the inventions.

Referring to FIG. 2 of the drawings, there is shown a flowchart of operations performed by the finite state grammar generator 104 in order to generate a finite state grammar, in accordance to one embodiment of the invention. Starting at block 200, the finite state grammar generator 104 receives user input of at least two sample phrases via the input function 104.1. For example, suppose that a developer is trying to develop a finite state grammar for the return value "H P480". In this case the developer may enter three or four sample phrases, for example the phrases "four eighty", and "H P four eighty". At block 202, the input sample phrases are analyzed to determine common words that occur in each of the sample phrases and optional words that occur in only some of the sample phrases. This step is performed by the analyzing and grammar generation function 104.2. At block 204, a mathematical expression representing the sample phrases is created. The mathematical expression includes each word found in the sample phrases and indication of whether a word is a common word or optional word.

Figure 3:
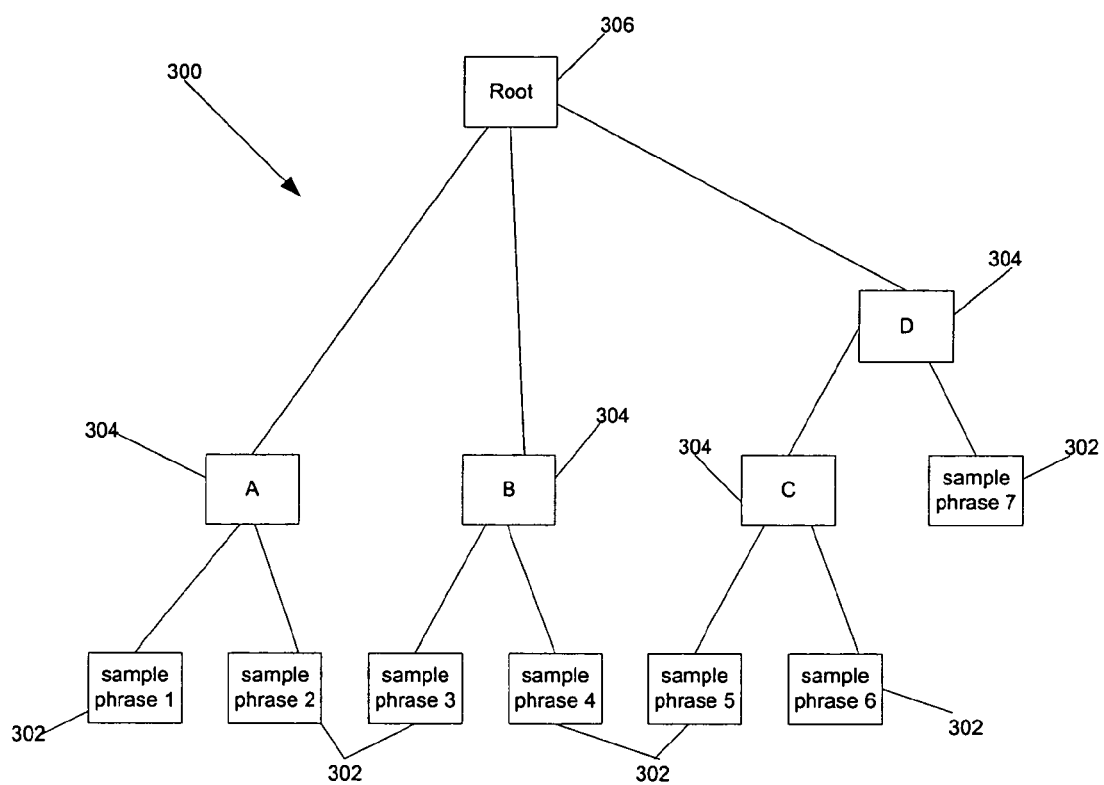
FIG. 3 illustrates how a tree-data structure may be used to generate a mathematical expression for a given set of input sample phrases, in accordance with one embodiment of the invention.

In one embodiment, the operation of blocks 202 and 204 may be performed by an algorithm that makes use of a tree-data structure to analyze the sample phrases and to generate the mathematical expression. One example of such a tree-data structure is illustrated by reference numeral 300 in FIG. 3 of the drawings. Referring to FIG. 3, it will be seen that the tree-data structure 300 comprises a plurality of end or base nodes 302, each of which represents an input sample phrase. For example, suppose that the developer inputs the following sample phrases:

(1) "H P four eighty";
(2) "four eighty";
(3) "four eight zero";
(4) "H P four eight zero";
(5) "H P forty eight zero;
(6) "H P four hundred and eighty"; and
(7) "H P four hundred eighty" In this case, nodes 302 will be inserted into the tree-data structure 300 to correspond to each of the input sample phrases. Thereafter, pairs of sample phrases are analyzed in order to determine words that occur commonly in each pair of sample phrases and words that occur optionally in each pair of sample phrases. Based on the comparison, a mathematical expression is generated to represent the pairs of sample phrases. For example, using the notation that [ ] represents an "or", ( ) represents an "and", "?" denotes a zero or one occurrence, the mathematical expression representing sample phrases (1) and (2), above may be written in the form: [?(H P)(forty eighty)].

Each mathematical expression generated for the pairs of sample phrases is represented in the tree-structure 300, as a node 304. It will be seen, that since an odd number of sample phrases were initially input, the sample phrase (7) was initially not paired with any other sample phrase. The sample phrase (7) can later be paired with one of the mathematical expressions representing a pair of sample phrases for purposes of identifying words that are common and words that are only optional between the sample phrase (7), and the mathematical expression to which it is paired. For example, as illustrated in FIG. 3 of the drawings, the sample phrase (7) is paired with the node 304 marked "C" which corresponds to the mathematical expression generated for the pair comprising sample phrases (5) and (6). The algorithm then compares the values for each pair of nodes 304 to determine a more compact or simplified mathematical expression to represent the expressions for the pair of nodes 304 using the above notation. Eventually, all nodes of the tree-data structure are traversed and a simplified or compact mathematical expression is generated in order to represent all phrases of the tree-data structure in accordance with the above notation. The simplified/compact mathematical expression designs the root node 306 of the tree-data structure.

In order to enhance understanding of the above described algorithm, values of the nodes A, B, C and D in FIG. 3 of the drawings are provided below:

Node A: [?(H P)(four eighty)];
Node B: [?(H P)(four eight zero)];
Node C: [?(H P)[(four eight zero)(four hundred and eighty)]];
Node D: [?(H P)[(forty eight zero)(four hundred ? and eight)]]

Based on the above algorithm, the root node 306 has the following generated mathematic expression:

[?(H P)[(forty eight zero)(four[(?(hundred ? and) eighty)(eighty zero)]]]

Referring again to FIG. 2 of the drawings, at block 206, using the output function 104.3, the mathematical expression stored in the root node 306 is displayed to a user/developer. At block 208 the input function 104.1 receives input allowing the user to alter the mathematical expression. For example, the user may add or delete a word from the mathematical expression, make a common word in a mathematical expression optional, or make an optional word in the mathematical expression common. Based on the input of the user, at block 210, the analyzing and grammar generation function 104.2 generates a modified finite state grammar corresponding to the altered/modified mathematical expression. At block 212, the modified finite state grammar is displayed to the user.

The steps 208 to 212 are performed repeatedly until the user is satisfied that the finite state grammar that is generated is adequate. For example, a user may enter only a few sample phrases in order for the finite state grammar generator 104 to generate the basic form of the mathematical expression corresponding to the input sample phrases. Once the user can see the basic form of the mathematical expression, then the user would modify the expression by perhaps adding more words or making an optional word common so as to cause the finite state grammar generation function 104 to generate a more comprehensive grammar. As stated above, one advantage of the techniques disclosed herein is that a user is provided immediate visual feedback of the depth or comprehensiveness of a finite state grammar, and can immediately tweak or alter the mathematical expression representing the finite state grammar to either increase its depth or to decrease it.

Referring to FIG. 4 of the drawings, reference numeral 400 generally indicates hardware that may be used to implement the system 100, in accordance with one embodiment. The hardware 400 typically includes at least one processor 402 coupled to a memory 404. The processor 402 may represent one or more processors (e.g., microprocessors), and the memory 404 may represent random access memory (RAM) devices comprising a main storage of the hardware 400, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware 400, e.g. any cache memory in the processor 402, as well as any storage capacity used as a virtual memory, e.g., as stored on a mass storage device 410.

The hardware 400 also typically receives a number of inputs and outputs for communicating information externally. For interface with a user or operator, the hardware 400 may include one or more user input devices 406 (e.g., a keyboard, a mouse, etc.) and a display 408 (e.g., a Cathode Ray Tube (CRT) monitor, a Liquid Crystal Display (LCD) panel).

For additional storage, the hardware 400 may also include one or more mass storage devices 410, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 412 (e.g., a local area network (LAN), a wide area network (WAN), a wireless network, and/or the Internet among others) to permit the communication of information with other computers coupled to the networks. It should be appreciated that the hardware 400 typically includes suitable analog and/or digital interfaces between the processor 402 and each of the components 404, 406, 408 and 412 as is well known in the art.

The hardware 400 operates under the control of an operating system 414, and executes various computer software applications 416, components, programs, objects, modules, etc. (e.g. a program or module which performs operations described above). Moreover, various applications, components, programs, objects, etc. may also execute on one or more processors in another computer coupled to the hardware 400 via a network 412, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    receiving input of a plurality of sample phrases each comprising a plurality of words;
    representing each sample phrase as a node in a tree;
    forming a mathematical expression for each pair of nodes in the tree, the mathematical expression comprising a plurality of words found in the sample phrases of a pair of nodes and an indication of whether a word is a common word that occurs in each of the plurality of phrases or an optional word that occurs in some of the plurality of phrases for the pair of nodes; and
    generating a compact mathematical expression by comparing mathematical expressions, wherein the compact mathematical expression includes each of the plurality of words found in the sample phrases and an indication of whether each of the plurality of words is a common word or an optional word.

2. The method of claim 1 comprising allowing the compact mathematical expression to be altered.

3. The method of claim 2 comprising generating a finite state grammar corresponding to the altered compact mathematical expression.

4. The method of claim 2, wherein allowing the compact mathematical expression to be altered comprises receiving inputs from at least one of: adding a word to the mathematical expression, deleting a word from the mathematical expression, making a common word in the mathematical expression optional; and making an optional word in the mathematical expression common.

5. The method of claim 1 comprising receiving input of further sample phrases.

6. The method of claim 1 comprising forming the mathematical expression for each pair of nodes in the tree to represent the sample phrases associated with the pair of nodes.

7. A non-transitory computer-readable storage medium comprising instructions for:
    receiving input of a plurality of sample phrases each comprising a plurality of words;
    representing each sample phrase as a node in a tree;
    forming a mathematical expression for each pair of nodes in the tree, the mathematical expression comprising a plurality of words found in the sample phrases of the pair of nodes and an indication of whether a word is a common word that occurs in each of the plurality of phrases or an optional word that occurs in some of the plurality of phrases for the pair of nodes; and
    generating a compact mathematical expression by comparing mathematical expressions, wherein the compact mathematical expression includes each of the plurality of words found in the sample phrases and an indication of whether each of the plurality of words is a common word or an optional word.

8. The non-transitory computer-readable storage medium of claim 7 comprising instructions for allowing the compact mathematical expression to be altered.

9. The non-transitory computer-readable storage medium of claim 8 comprising instructions for generating a finite state grammar corresponding to the altered compact mathematical expression.

10. The non-transitory computer-readable storage medium of claim 8, wherein allowing the compact mathematical expression to be altered comprises instructions for receiving inputs from at least one of: adding a word to the mathematical expression, deleting a word from the mathematical expression, making a common word in the mathematical expression optional; and making an optional word in the mathematical expression common.

11. The non-transitory computer-readable storage medium of claim 7 comprising instructions for receiving input of further sample phrases.

12. The non-transitory computer-readable storage medium of claim 7, wherein the forming of the mathematical expression for each pair of nodes in the tree represents the sample phrases associated with the pair of nodes.

13. A system, comprising:
a processor; and
a memory coupled to the processor;
wherein the processor is configured to:
receive input of a plurality of sample phrases each comprising a plurality of words;
represent each sample phrase as a node in a tree;
form a mathematical expression for each pair of nodes in the tree, the mathematical expression comprising a plurality of words found in the sample phrases of the pair of nodes and an indication of whether a word is a common word that occurs in each of the plurality of phrases or an optional word that occurs in some of the plurality of phrases for the pair of nodes; and
generate a compact mathematical expression by comparing mathematical expressions, wherein the compact mathematical expression includes each of the plurality of words found in the sample phrases and an indication of whether each of the plurality of words is a common word or an optional word.

14. The system of claim 13, wherein the processor is configured to allow the compact mathematical expression to be altered.

15. The system of claim 14, wherein the processor is configured to generate a finite state grammar corresponding to the altered compact mathematical expression.

16. The system of claim 14, wherein the processor is configured to allow the compact mathematical expression to be altered comprises receipt of an input from at least one of: a word added to the mathematical expression, a word deleted from the mathematical expression, a common word made in the mathematical expression optional; and an optional word made in the mathematical expression common.

17. The system of claim 13, wherein the processor is configured to receive input of further sample phrases.

18. The system of claim 13, wherein the mathematical expression for each pair of nodes in the tree is formed to represent the sample phrases associated with the pair of nodes.

* * * * *